J. T. DALCHER.
OIL BURNER FOR STOVES, FURNACES, &c.
APPLICATION FILED JULY 22, 1918.

1,281,301.

Patented Oct. 15, 1918.

Inventor:
John T. Dalcher,
by Walter E. Lombard.
Atty.

UNITED STATES PATENT OFFICE.

JOHN T. DALCHER, OF QUINCY, MASSACHUSETTS.

OIL-BURNER FOR STOVES, FURNACES, &c.

1,281,301.   Specification of Letters Patent.   Patented Oct. 15, 1918.

Application filed July 22, 1918. Serial No. 246,261.

*To all whom it may concern:*

Be it known that I, JOHN T. DALCHER, a citizen of the United States of America, and a resident of Quincy, county of Norfolk, and State of Massachusetts, have invented certain new and useful Improvements in Oil-Burners for Stoves, Furnaces, &c., of which the following is a specification.

This invention relates to oil burners adapted for use in stoves, boilers, and the like and it has for its object the production of an apparatus of this kind which will be simple in construction and effective in operation.

The invention consists primarily in an oil pan having centrally disposed therein a tubular member supporting a flaring hood and provided with a plurality of radial outlets through which the air, heated in its passage through said tubular member, may be projected downwardly onto the oil in said pan.

The invention further consists in certain novel features of construction and arrangement of parts which will readily be understood by reference to the claims hereinafter given.

For the purpose of illustrating the invention, one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings.

Similar characters indicate like parts through the several figures of the drawings.

Figure 1:
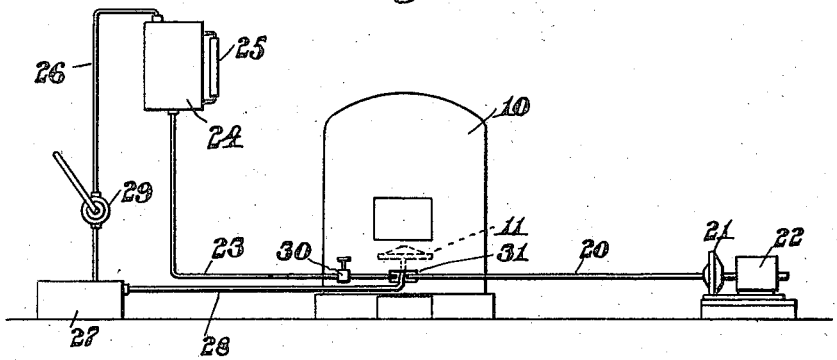
Figure 1 represents a diagram showing the manner in which said oil burner is used and supplied with oil and air.
Figure 2:
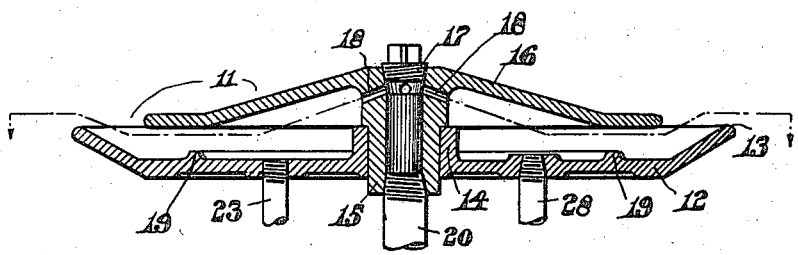
Fig. 2 represents a vertical section of an oil burner embodying the principles of the present invention.
Figure 3:
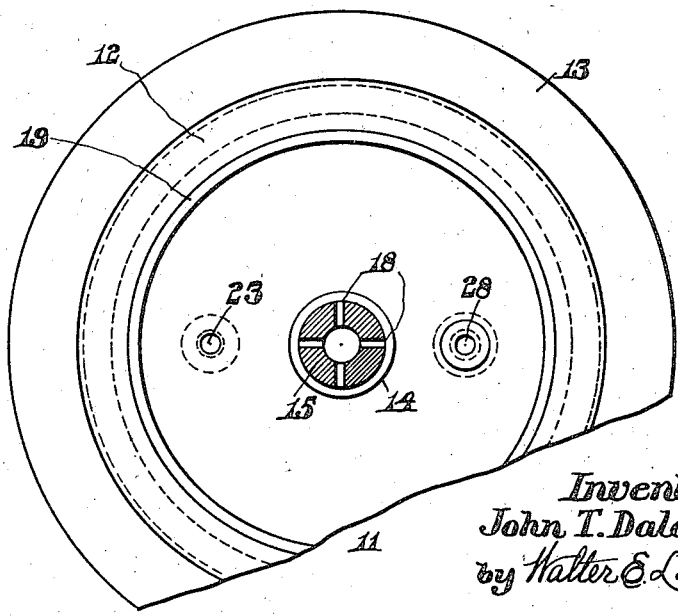
Fig. 3 represents a horizontal section of the same, on line 3, 3, on Fig. 2.

In the drawings 10 is a boiler or heater having positioned therein a burner 11. This burner 11 consists of an oil pan 12 preferably circular and having an upwardly inclined flange 13 at the edge thereof.

Centrally disposed in the pan 12 is a tubular hub 14 adapted to receive the reduced end of the tubular member 15 having formed integral with its upper end the circular hood 16 which flares downwardly from the center toward the pan 12 and has a diameter less than that of the oil pan 12, the outer edge of said hood preferably being within the circular plane of the inclined flange 13.

The upper end of the tubular supporting member 15 is provided with a plurality of radial outlets 18 inclined downwardly toward the upper face of the oil pan 12.

This oil pan 12 has projecting upwardly therefrom an annular ridge 19 within which the oil is ordinarily confined.

To the lower end of the tubular member 15 is threaded an air inlet pipe 20, the opposite end of said pipe being connected to the blower 21, driven by the motor 22.

When the motor is in operation the blower 21 will force air under pressure through the pipe 20 and the tubular member 15, said air being projected through the outlets 18 onto the upper surface of the oil pan 12.

Extending from the oil pan 12 is an oil supply pipe 23 the opposite end of which communicates with the gravity tank 24 having a gage glass 25 mounted thereon.

Extending from the upper end of the gravity tank 24 is a pipe 26 communicating at its lower end with the drain tank 27. From the tank 27 a pipe 28 extends into the oil pan 12, the end of said pipe being slightly above the inner surface of said pan 12.

When the oil in the pan 12 reaches the level of the inner end of said pipe 28 the oil in the pan will flow therefrom through the pipe 28 into the tank 27.

The pipe 26 is provided with a pump 29 which may be operated manually or otherwise to force the oil from the tank 27 into the gravity tank 24.

The oil is supplied to the pan 12 from the tank 24 and the amount of oil thus supplied may be controlled by means of the valve 30.

The air forced through the pipe 20 into the interior of the tubular member 15 is heated by the burning oil to a high degree of temperature before it is mixed with the gases.

This super-heated air when forced through the outlets 18 onto the burning oil is thoroughly mixed with the vapors thereof thereby giving a complete combustion and preventing the accumulation of soot and carbon which so frequently occurs in devices of this class.

By means of this construction of burner, either kerosene or any heavy oil may be utilized therein.

A certain amount of draft for the burner may be secured through the openings 31 in the front of the boiler or heater through which the pipes 20, 23, 28 pass to the interior of the burner casing.

In operation the oil is turned on and a limited quantity thereof is permitted to flow into the pan 12. The oil supply is then cut off by means of the valve 30 and the oil in the pan ignited.

The burning of the oil in the pan quickly heats said pan and the hood 16 above said pan and also heats the tubular supporting member 15.

When the valve 30 is again opened to permit the oil from the gravity tank 24 to flow into the pan 12 the intense heat of the members 12, 15, 16 will cause the oil to be at once vaporized when it comes into contact with the heated surfaces of these members.

The motor 22 having been placed in operation the air forced by the blower 21 through the tubular member 15 becomes intensely heated before passing from said tubular member through the outlets 18.

This super-heated air emitted from the outlets 18 onto the vapor formed by the burning oil becomes immediately thoroughly mixed with said vapors and a highly combustible gas is formed which burns fiercely with an intense heat, the flames issuing through the circular space between the outer edge of the hood 16 and the upwardly inclined flange 13 of the oil pan 12.

Owing to the super-heating of the air before it mixes with the vapor of the burning oils, the efficiency of the burner is greatly increased and at the same time the depositing of any objectionable carbon residue is reduced to a minimum.

It is believed that the operation and the many advantages of the invention will be thoroughly understood without further description.

Having thus described my invention, I claim:

1. An oil pan; a tubular member centrally disposed thereon and provided with a plurality of radial outlets; a hood supported on said tubular member; an air pipe connected to the lower end of said tubular member, and means for forcing air through said pipe and ejecting said air through said radial outlets.

2. An oil pan having an upwardly inclined rim; a tubular member centrally disposed thereon and provided with a plurality of radial outlets; a hood supported on said tubular member above said oil pan with its lower face in the same horizontal plane with the upper edge of said rim and having a diameter less than that of the oil pan; and an air pipe connected to the lower end of said tubular member.

3. An oil pan; a tubular member centrally disposed thereon and provided with a plurality of radial outlets extending downwardly toward said oil pan; a hood supported on said tubular member; and an air pipe connected to the lower end of said tubular member.

4. An oil pan; a tubular member centrally disposed thereon and provided with a plurality of radial outlets extending downwardly toward said oil pan; a hood supported on said tubular member; an air pipe connected to the lower end of said tubular member; and means for forcing air through said pipe.

Signed by me at Quincy, Mass., this 16th day of July, 1918.

JOHN T. DALCHER.